(12) United States Patent
Geozalian

(10) Patent No.: US 6,702,339 B1
(45) Date of Patent: Mar. 9, 2004

(54) FISHING HOOK KNOT TIGHTENING DEVICE

(76) Inventor: Khachik Geozalian, 949 N. Normandy Ave., Apt. 1, Los Angeles, CA (US) 90029

( * ) Notice: Subject to any disclaimer, the term of this patent is extended or adjusted under 35 U.S.C. 154(b) by 0 days.

(21) Appl. No.: 10/269,904

(22) Filed: Oct. 11, 2002

(51) Int. Cl.[7] .................................................. D03J 3/00
(52) U.S. Cl. ................................ 289/17; 289/1.5; 43/4
(58) Field of Search ........................... 289/1.2, 1.5, 17, 289/18.1; 7/106; 24/115 R, 128, 129 D, 129 R; 43/1, 4, 43.16

(56) References Cited

U.S. PATENT DOCUMENTS

| | | | | |
|---|---|---|---|---|
| 2,697,624 A | * | 12/1954 | Thomas et al. ................ 289/17 |
| 3,106,417 A | * | 10/1963 | Clow ............................. 289/17 |
| 3,396,998 A | * | 8/1968 | Scoville ......................... 289/17 |
| 3,588,078 A | * | 6/1971 | Van De Sande .............. 269/6 |
| 3,712,651 A | * | 1/1973 | Shockley ..................... 289/17 |
| 3,837,691 A | * | 9/1974 | Smythe ........................ 289/17 |
| 4,101,152 A | * | 7/1978 | Gardipee ...................... 289/17 |
| 4,403,797 A | * | 9/1983 | Ragland, Jr. ................. 289/17 |
| 4,864,762 A | * | 9/1989 | Cox ............................. 289/17 |
| 5,437,682 A | * | 8/1995 | Grice et al. ................. 606/148 |
| 5,593,189 A | * | 1/1997 | Little ........................... 289/17 |
| 5,647,616 A | * | 7/1997 | Hamilton ..................... 289/17 |
| 5,685,037 A | * | 11/1997 | Fitzner et al. ................ 7/106 |
| 5,829,798 A | * | 11/1998 | Little ........................... 289/17 |
| 6,322,112 B1 | * | 11/2001 | Duncan ....................... 289/1.5 |
| 6,434,878 B1 | * | 8/2002 | Milton ............................ 43/4 |

* cited by examiner

*Primary Examiner*—Gary L. Welch
(74) *Attorney, Agent, or Firm*—Goldstein Law Offices, P.C.

(57) ABSTRACT

A fishing hook knot tightening device for tying and tightening a knot between a fishing hook and a fishing line. The device has a T-shaped handle, an eyelet attached to the handle, and a blade incorporated into the handle for cutting the fishing line. In use, the fishing line leader end is threaded through the fishing hook eye, and the fishing line is tied into a knot and pulled tight. The barbed portion of the fishing hook is then hooked through the eyelet at the end of the handle vertical piece. The knot is tightened by gripping the T-shaped handle with one hand, holding the fishing line with the other hand, and then pulling the hands in opposite directions. Once the knot is sufficiently tightened, the blade may be used to cut the fishing line as necessary.

5 Claims, 3 Drawing Sheets

FISHING HOOK KNOT TIGHTENING DEVICE

BACKGROUND OF THE INVENTION

The invention relates to a fishing hook knot tightening device. In particular, the invention is a device which aids a person in tightening a knot between a fishing hook and a fishing line while preventing injury to the user or damage to the hook.

When preparing a fishing line, it is necessary to secure a fishing hook to the line. The line is typically secured to the hook by tying a knot around the eye. However, it is difficult to successfully tie and tighten a knot around the fishing hook without damaging the hook. When trying to tighten the knot, it is common to bend or misshape the hook. Further, because of the sharpness of the hook, it is common for the user to pierce his or her skin.

Thus, there exists a need for a fishing hook knot tightening device that aids a user in tightening a fishing line around a fishing hook. The device is constructed to prevent injury to the user from contact with the hook, as well as damage to the hook.

While the units available may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved fishing hook knot tightening device. As such, the general purpose of the present invention, which will be described subsequently in greater detail, is to provide a fishing hook knot tightening device which has all the advantages of the prior art and none of the disadvantages.

To attain this, the present invention essentially comprises a fishing hook knot tightening device for tying and tightening a knot between a fishing hook and a fishing line. The device has a T-shaped handle, an eyelet attached to the handle, and a blade incorporated into the handle for cutting the fishing line. In use, the fishing line leader end is threaded through the fishing hook eye, and the fishing line is tied in a knot around the eye and pulled tight. The hook portion of the fishing hook is then hooked through the eyelet at the end of the handle vertical piece. The knot is tightened by gripping the T-shaped handle with one hand while holding the fishing line with the other hand and pulling the hands in opposite directions. Once the knot is sufficiently tightened, the blade may be used to cut the fishing line as necessary.

It is an object of the invention to produce a fishing hook knot tightening device that aids a user in tightening a knot between a fishing line and a fishing hook. Accordingly, the device comprises a handle portion and an eyelet, wherein the hook is hooked in the eyelet and the handle portion is used to pull the knot tight.

It is a further object of the invention to produce a fishing hook knot tightening device that allows the user to cut the fishing line as necessary. Accordingly, the device has a blade incorporated into a recess within the handle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

REFERENCE NUMERALS

Figure 1:
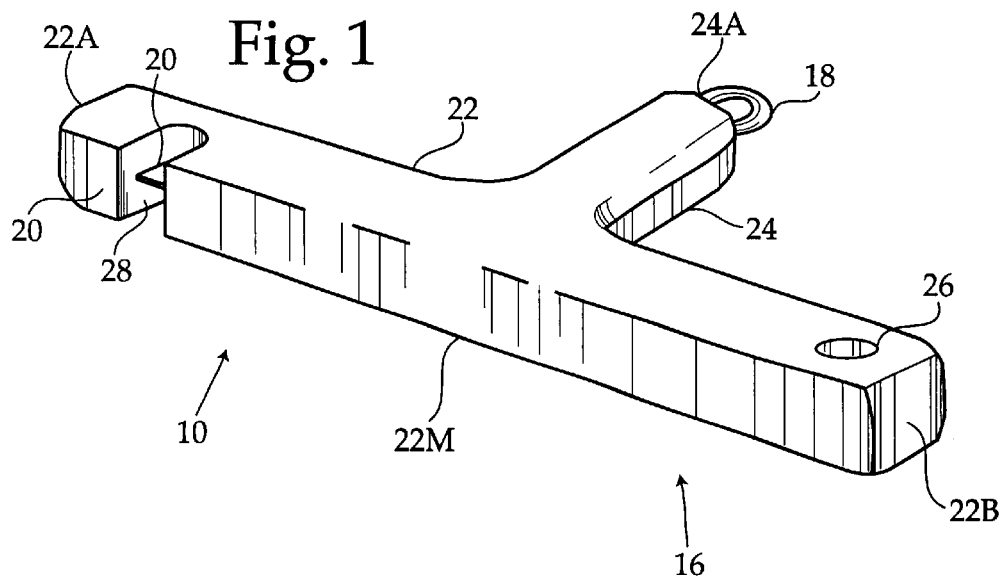
FIG. 1 is a perspective view of the fishing hook knot tightening device, showing the blade.

10 fishing hook knot tightening device
12 fishing hook
12H barbed portion
12E hook eye
14 fishing line
14L fishing line leader end
16 T-shaped handle
18 eyelet
20 blade
22 handle horizontal piece
22A handle horizontal piece first end
22B handle horizontal piece second end
22M handle horizontal piece middle portion
24 handle vertical piece
24A handle vertical piece end
26 aperture
28 blade slot

DETAILED DESCRIPTION OF THE PREFERRED EMBODIMENTS

FIG. 1 illustrates a fishing hook knot tightening device 10 for tying and tightening a knot between a fishing hook 12 and a fishing line 14, the fishing line 14 having a leader end 14L. The fishing hook 12 has a barbed portion 12H and an eye 12E, wherein the eye 12E is positioned opposite the barbed portion 12H. The fishing line leader end 14L is threaded through the hook eye 12E and tied therearound. The device 10 essentially comprises a T-shaped handle 16 and an eyelet 18 attached thereto. The device 10 also has a blade 20 incorporated into the handle 16 for cutting the fishing line 14.

Figure 2:
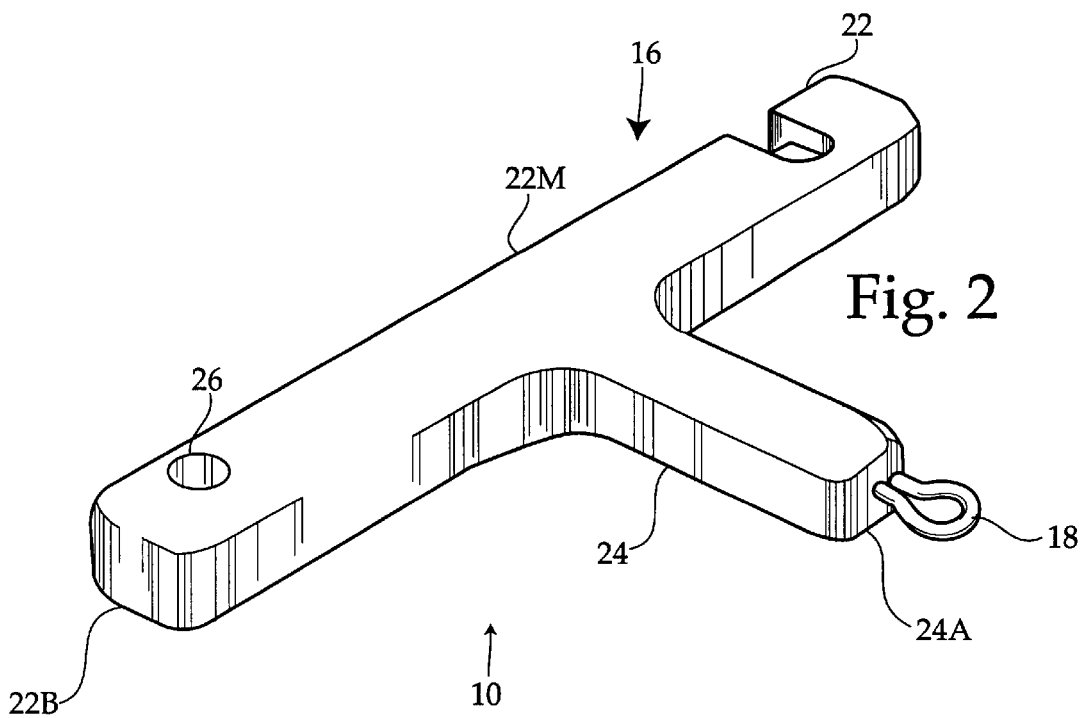
FIG. 2 is a perspective view of the fishing hook knot tightening device, showing the eyelet attached to the handle vertical piece.

The T-shaped handle 16 has a horizontal piece 22 and a vertical piece 24. The horizontal piece 22 has a first end 22A, a second end 22B, and a middle portion 22M therebetween. The vertical piece 24 extends outward from the horizontal piece middle portion 22M, said vertical piece 24 being substantially perpendicular to the horizontal piece 22. An aperture 26 extends through the second end 22B, said aperture 26 used to secure the device 10 to the user's body. By way of example, a cord may be inserted through the aperture 26 and tied around the user's belt. In that way, the device 10 would be conveniently located and readily available for use. At the first end 22A of the horizontal piece 22, the blade 20 is positioned for cutting the fishing line 14. The blade 20 is housed in a slot 28 incorporated into the handle horizontal piece 22. The blade 20 is positioned within the slot 28 so that it is capable of cutting the line when inserted into the slot 28. However, the blade 20 is sufficiently recessed so that it is incapable of cutting the user, even when the user tightly grips the handle 16. Referring to FIG. 2, the handle vertical piece 24 has an end 24A opposite the horizontal piece 22. The eyelet 18 extends outward from this vertical piece end 24A.

The T-shaped handle 16 is sized to be held by an average adult person. The handle 16 is preferably constructed from a sturdy, lightweight material, namely polypropylene. Such a material is easily molded during manufacturing and remains durable during use. The eyelet 18 is preferably constructed from a water resistant material, namely stainless steel.

Figure 3:
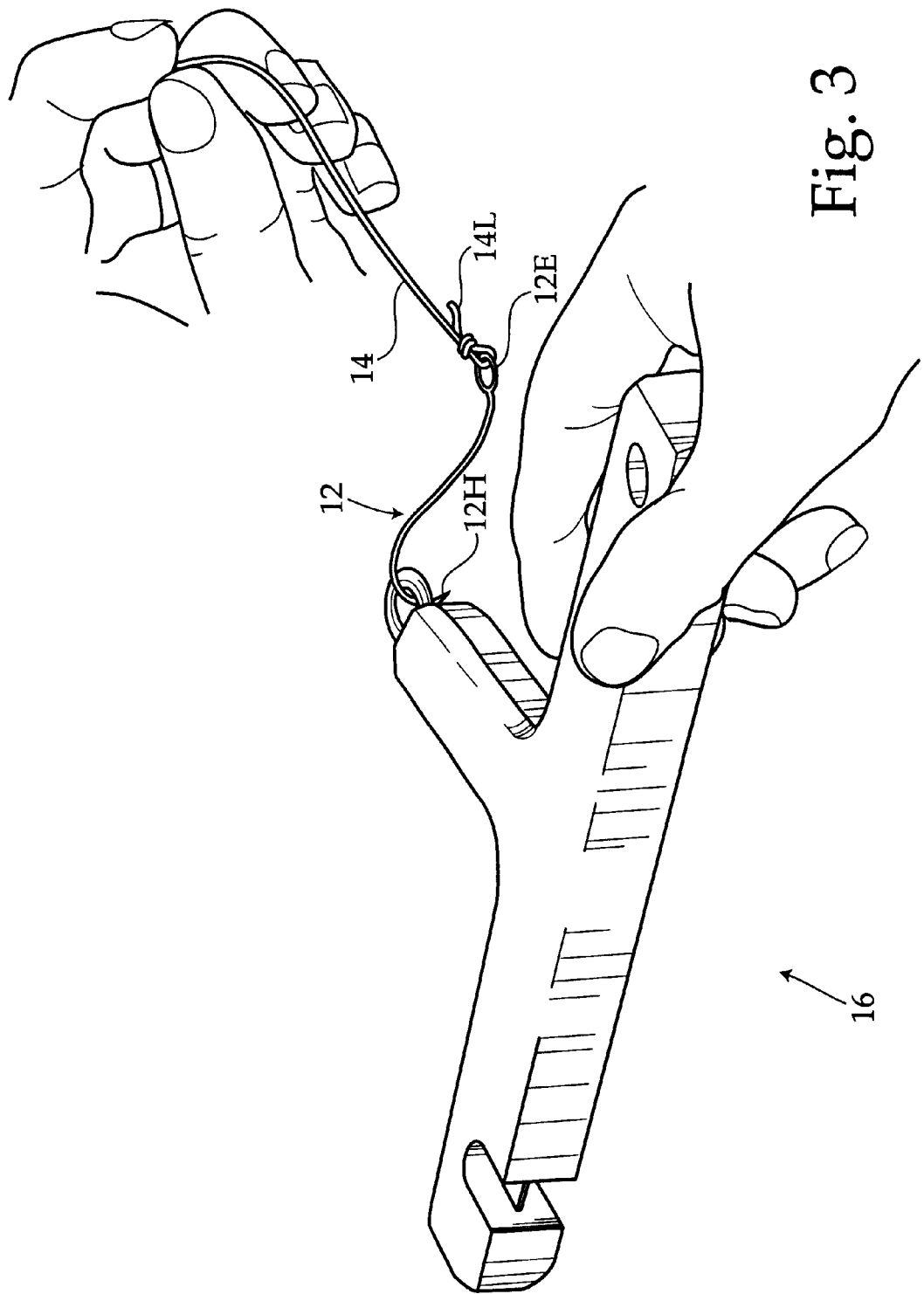
FIG. 3 is a perspective view of the device, wherein the hook has been inserted into the eyelet and the line is about to be pulled away from the handle to tighten the hook knot.
Figure 4:
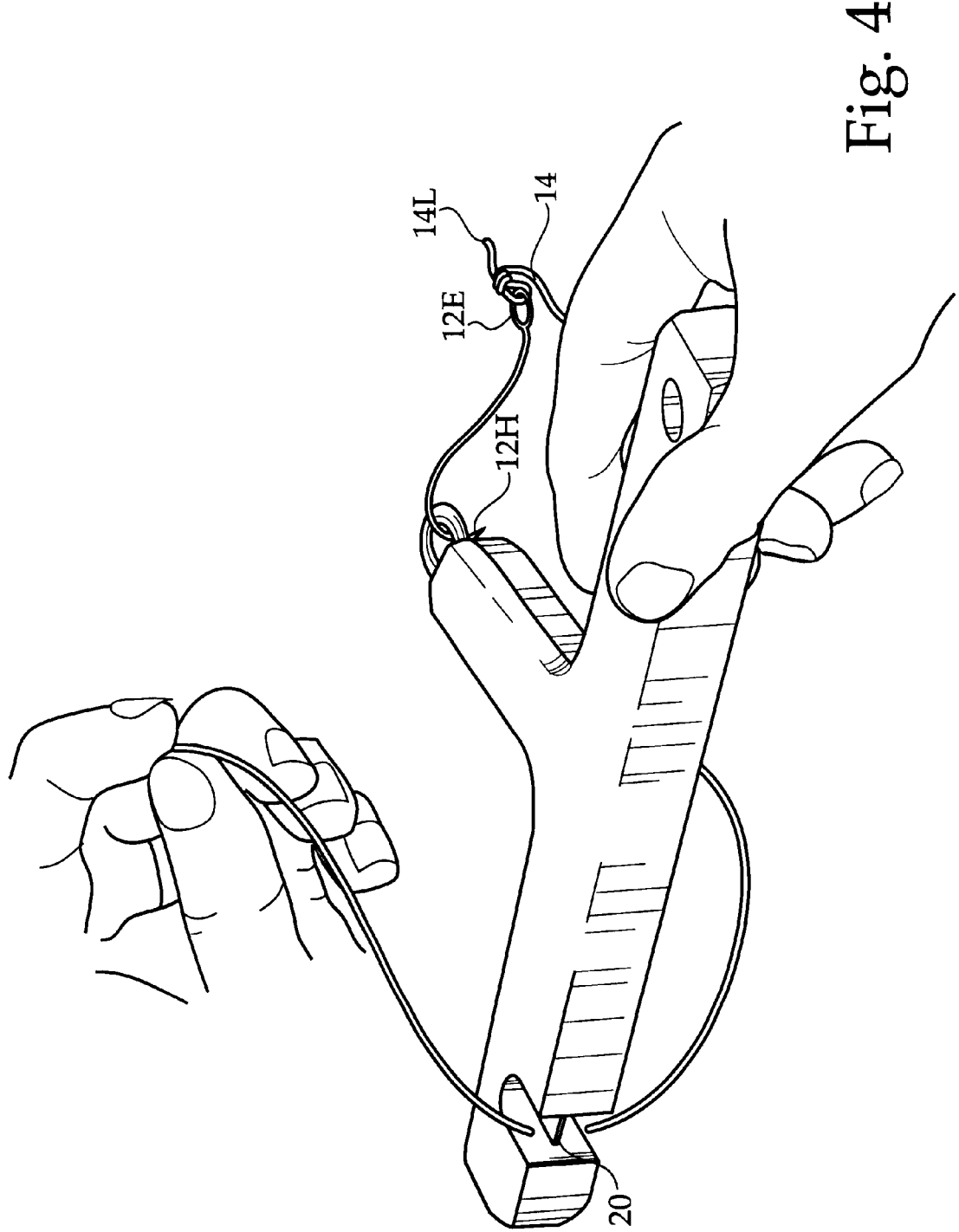
FIG. 4 is a perspective view of the device, illustrating the use of the blade to cut the fishing line.

In use, the fishing line leader end 14L is threaded through the hook eye 12E, and the fishing line 14 is tied in a knot and pulled tight. As illustrated in FIG. 3, the barbed portion 12H of the fishing hook 12 is then hooked through the eyelet 18 at the end of the handle vertical piece 24. The device 10 is then gripped in a user's first hand, while the user's second hand grasps onto the fishing line 14 attached to the fishing hook 12. The user's hands are then firmly pulled in opposite directions in order to tighten the knot on the hook 12. Once the knot is sufficiently tightened, the blade 20 may be used to cut the fishing line 14 as necessary, as illustrated in FIG. 4.

In conclusion, herein is presented a fishing hook knot tightening device for securing a fishing line through a fishing hook. The invention is illustrated by example in the drawing figures, and throughout the written description. It should be understood that numerous variations are possible, while adhering to the inventive concept. Such variations are contemplated as being a part of the present invention.

What is claimed is:

1. A fishing hook knot tightening device for tightening a knot between a fishing hook and a fishing line, the fishing line having a leader end, and the fishing hook having a barbed portion and an eye, comprising:

a T-shaped handle, the T-shaped handle having a horizontal piece and a vertical piece, the horizontal piece having a first end, a second end, and a middle portion therebetween, the vertical piece extends substantially perpendicular to the horizontal piece middle portion, said vertical piece having an end positioned opposite the horizontal piece; and an eyelet, the eyelet extending outward from the vertical piece end, the eyelet for accommodating the barbed portion of the fishing hook while tightening the knot there around, wherein the handle horizontal piece further has an aperture extending through the second end for accommodating a fastening unit that a user can selectively utilize to secure the device to his body, and wherein the eyelet is constructed from stainless steel.

2. The fishing hook knot tightening device as recited in claim 1, further comprising a blade slot incorporated into the handle and a blade recessed within the blade slot for cutting the fishing line.

3. The fishing hook knot tightening device as recited in claim 1, wherein the T-shaped handle is constructed from polypropylene.

4. A method of tightening a knot between a fishing line and a fishing hook using the fishing hook knot tightening device as recited in claim 1, comprising the steps of:

threading the fishing line leader end through the hook eye;

tying the fishing line in a knot around the hook eye;

hooking the hook portion of the fishing hook through the eyelet;

tightening the knot by gripping the T-shaped handle with one hand while holding the fishing line with the other hand and pulling the hands in opposite directions; and removing the hook from the eyelet.

5. The method of tightening a knot as recited in claim 4, wherein the tightening device further comprises a blade slot in the handle area and a blade incorporated into the blade slot, and wherein the step of tightening the knot is following by inserting the fishing line into the slot and cutting the fishing line with the blade.

* * * * *